US009489176B2

(12) United States Patent
Haugen

(10) Patent No.: US 9,489,176 B2
(45) Date of Patent: Nov. 8, 2016

(54) OPTIMIZED MATRIX AND VECTOR OPERATIONS IN INSTRUCTION LIMITED ALGORITHMS THAT PERFORM EOS CALCULATIONS

(75) Inventor: Kjetil B. Haugen, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 346 days.

(21) Appl. No.: 14/342,268

(22) PCT Filed: Jul. 23, 2012

(86) PCT No.: PCT/US2012/047860
§ 371 (c)(1),
(2), (4) Date: Feb. 28, 2014

(87) PCT Pub. No.: WO2013/039606
PCT Pub. Date: Mar. 21, 2013

(65) Prior Publication Data
US 2014/0201450 A1 Jul. 17, 2014

Related U.S. Application Data

(60) Provisional application No. 61/535,131, filed on Sep. 15, 2011.

(51) Int. Cl.
*G06F 7/38* (2006.01)
*G06F 7/60* (2006.01)
(Continued)

(52) U.S. Cl.
CPC .............. *G06F 7/60* (2013.01); *G06F 12/0875* (2013.01); *G06F 17/16* (2013.01)

(58) Field of Classification Search
CPC ....... G06F 7/60; G06F 12/0875; G06F 17/16
USPC .................................................. 708/490, 607
See application file for complete search history.

(56) References Cited

U.S. PATENT DOCUMENTS 5,537,320 A 7/1996 Simpson et al.
5,629,845 A * 5/1997 Liniger ................... G06F 17/12
700/67

(Continued)

FOREIGN PATENT DOCUMENTS

WO 99/28767 6/1999
WO 2007/022289 2/2007

(Continued)

OTHER PUBLICATIONS

Aarnes, J. (2004), "Multiscale simulation of flow in heterogeneous oil-reservoirs", SINTEF ICT, Dept. of Applied Mathematics, 2 pgs.

(Continued)

*Primary Examiner* — Tan V. Mai
(74) *Attorney, Agent, or Firm* — ExxonMobil Upstream Research Company-Law Department

(57) ABSTRACT

There is provided a system and method for optimizing matrix and vector calculations in instruction limited algorithms that perform EOS calculations. The method includes dividing each matrix associated with an EOS stability equation and an EOS phase split equation into a number of tiles, wherein the tile size is heterogeneous or homogenous. Each vector associated with the EOS stability equation and the EOS phase split equation may be divided into a number of strips. The tiles and strips may be stored in main memory, cache, or registers, and the matrix and vector operations associated with successive substitutions and Newton iterations may be performed in parallel using the tiles and strips.

17 Claims, 8 Drawing Sheets

(51) Int. Cl.
  *G06F 17/16* (2006.01)
  *G06F 12/08* (2016.01)

(56) References Cited

U.S. PATENT DOCUMENTS

| | | | |
|---|---|---|---|
| 5,666,367 A * | 9/1997 | Troyanovsky | G06F 17/5036 714/724 |
| 5,671,136 A | 9/1997 | Willhoit, Jr. | |
| 5,706,194 A | 1/1998 | Neff et al. | |
| 5,710,726 A | 1/1998 | Rowney et al. | |
| 5,747,673 A | 5/1998 | Ungerer et al. | |
| 5,838,634 A | 11/1998 | Jones et al. | |
| 5,844,799 A | 12/1998 | Joseph et al. | |
| 5,953,680 A | 9/1999 | Divies et al. | |
| 5,992,519 A | 11/1999 | Ramakrishnan et al. | |
| 6,018,498 A | 1/2000 | Neff et al. | |
| 6,052,520 A | 4/2000 | Watts, III | |
| 6,106,561 A | 8/2000 | Farmer | |
| 6,128,577 A | 10/2000 | Assa et al. | |
| 6,128,579 A | 10/2000 | McCormack et al. | |
| 6,138,076 A | 10/2000 | Graf et al. | |
| 6,230,101 B1 | 5/2001 | Wallis | |
| 6,374,185 B1 | 4/2002 | Taner et al. | |
| 6,480,790 B1 | 11/2002 | Calvert et al. | |
| 6,549,854 B1 | 4/2003 | Malinverno et al. | |
| 6,597,995 B1 | 7/2003 | Cornu et al. | |
| 6,662,146 B1 | 12/2003 | Watts | |
| 6,664,961 B2 | 12/2003 | Ray et al. | |
| 6,823,296 B2 | 11/2004 | Rey-Fabret et al. | |
| 6,823,297 B2 | 11/2004 | Jenny et al. | |
| 6,826,483 B1 | 11/2004 | Anderson et al. | |
| 6,826,520 B1 | 11/2004 | Khan et al. | |
| 6,826,521 B1 | 11/2004 | Hess et al. | |
| 6,839,632 B2 | 1/2005 | Grace | |
| 6,901,391 B2 | 5/2005 | Storm, Jr. et al. | |
| 6,940,507 B2 | 9/2005 | Repin et al. | |
| 6,980,940 B1 | 12/2005 | Gurpinar et al. | |
| 6,987,878 B2 | 1/2006 | Lees et al. | |
| 7,043,367 B2 | 5/2006 | Granjeon | |
| 7,069,149 B2 | 6/2006 | Goff et al. | |
| 7,089,166 B2 | 8/2006 | Malthe-Sorenssen et al. | |
| 7,096,122 B2 | 8/2006 | Han | |
| 7,096,172 B2 | 8/2006 | Colvin et al. | |
| 7,177,787 B2 | 2/2007 | Rey-Fabret et al. | |
| 7,191,071 B2 | 3/2007 | Kfoury et al. | |
| 7,254,091 B1 | 8/2007 | Gunning et al. | |
| 7,277,796 B2 | 10/2007 | Kuchuk et al. | |
| 7,280,952 B2 | 10/2007 | Butler et al. | |
| 7,286,972 B2 | 10/2007 | Maker | |
| 7,363,163 B2 | 4/2008 | Valec-Dupin et al. | |
| 7,369,980 B2 | 5/2008 | Deffenbaugh et al. | |
| 7,373,285 B2 | 5/2008 | Webb | |
| 7,376,539 B2 | 5/2008 | Lecomte | |
| 7,379,853 B2 | 5/2008 | Middya | |
| 7,379,854 B2 | 5/2008 | Calvert et al. | |
| 7,406,878 B2 | 8/2008 | Rieder et al. | |
| 7,412,363 B2 | 8/2008 | Callegari | |
| 7,415,401 B2 | 8/2008 | Calvert et al. | |
| 7,424,415 B2 | 9/2008 | Vassilev | |
| 7,433,786 B2 | 10/2008 | Adams | |
| 7,451,066 B2 | 11/2008 | Edwards et al. | |
| 7,467,044 B2 | 12/2008 | Tran et al. | |
| 7,478,024 B2 | 1/2009 | Gurpinar et al. | |
| 7,480,205 B2 | 1/2009 | Wei | |
| 7,486,589 B2 | 2/2009 | Lee et al. | |
| 7,516,056 B2 | 4/2009 | Wallis et al. | |
| 7,523,024 B2 | 4/2009 | Endres et al. | |
| 7,526,418 B2 | 4/2009 | Pita et al. | |
| 7,539,625 B2 | 5/2009 | Klumpen et al. | |
| 7,542,037 B2 | 6/2009 | Fremming | |
| 7,546,229 B2 | 6/2009 | Jenny et al. | |
| 7,548,840 B2 | 6/2009 | Saaf | |
| 7,577,527 B2 | 8/2009 | Velasquez | |
| 7,584,081 B2 | 9/2009 | Wen et al. | |
| 7,596,056 B2 | 9/2009 | Keskes et al. | |
| 7,596,480 B2 | 9/2009 | Fung et al. | |
| 7,603,265 B2 | 10/2009 | Mainguy et al. | |
| 7,606,691 B2 | 10/2009 | Calvert et al. | |
| 7,617,082 B2 | 11/2009 | Childs et al. | |
| 7,620,800 B2 | 11/2009 | Huppenthal et al. | |
| 7,640,149 B2 | 12/2009 | Rowan et al. | |
| 7,657,494 B2 | 2/2010 | Wilkinson et al. | |
| 7,672,818 B2 | 3/2010 | Watts, III | |
| 7,672,825 B2 | 3/2010 | Brouwer et al. | |
| 7,684,929 B2 | 3/2010 | Prange et al. | |
| 7,706,981 B2 | 4/2010 | Wilkinson et al. | |
| 7,711,532 B2 | 5/2010 | Dulac et al. | |
| 7,716,029 B2 | 5/2010 | Couet et al. | |
| 7,739,089 B2 | 6/2010 | Gurpinar et al. | |
| 7,752,023 B2 | 7/2010 | Middya | |
| 7,756,694 B2 | 7/2010 | Graf et al. | |
| 7,783,462 B2 | 8/2010 | Landis, Jr. et al. | |
| 7,796,469 B2 | 9/2010 | Keskes et al. | |
| 7,809,537 B2 | 10/2010 | Hemanthkumar et al. | |
| 7,809,538 B2 | 10/2010 | Thomas | |
| 7,822,554 B2 | 10/2010 | Zuo et al. | |
| 7,844,430 B2 | 11/2010 | Landis, Jr. et al. | |
| 7,860,654 B2 | 12/2010 | Stone | |
| 7,869,954 B2 | 1/2011 | Den Boer et al. | |
| 7,877,246 B2 | 1/2011 | Moncorge et al. | |
| 7,878,268 B2 | 2/2011 | Chapman et al. | |
| 7,920,970 B2 | 4/2011 | Zuo et al. | |
| 7,925,481 B2 | 4/2011 | Van Wagoner et al. | |
| 7,932,904 B2 | 4/2011 | Branets et al. | |
| 7,933,750 B2 | 4/2011 | Morton et al. | |
| 7,937,359 B1 | 5/2011 | Zhang et al. | |
| 7,953,585 B2 | 5/2011 | Gurpinar et al. | |
| 7,970,593 B2 | 6/2011 | Roggero et al. | |
| 7,986,319 B2 | 7/2011 | Dommisse et al. | |
| 7,991,660 B2 | 8/2011 | Brady et al. | |
| 7,996,154 B2 | 8/2011 | Zuo et al. | |
| 8,005,658 B2 | 8/2011 | Tilke et al. | |
| 8,050,892 B2 | 11/2011 | Hartman | |
| 8,078,437 B2 | 12/2011 | Wu et al. | |
| 8,095,345 B2 | 1/2012 | Hoversten | |
| 8,095,349 B2 | 1/2012 | Kelkar et al. | |
| 8,145,464 B2 | 3/2012 | Arnegaard et al. | |
| 8,190,405 B2 | 5/2012 | Appleyard | |
| 8,204,726 B2 | 6/2012 | Lee et al. | |
| 8,204,727 B2 | 6/2012 | Dean et al. | |
| 8,209,202 B2 | 6/2012 | Narayanan et al. | |
| 8,212,814 B2 | 7/2012 | Branets et al. | |
| 8,249,842 B2 | 8/2012 | Ghorayeb et al. | |
| 8,255,195 B2 | 8/2012 | Yogeswaren | |
| 8,271,248 B2 | 9/2012 | Pomerantz et al. | |
| 8,275,589 B2 | 9/2012 | Montaron et al. | |
| 8,275,593 B2 | 9/2012 | Zhao | |
| 8,280,635 B2 | 10/2012 | Ella et al. | |
| 8,280,709 B2 | 10/2012 | Koutsabeloulis et al. | |
| 8,285,532 B2 | 10/2012 | Zangl et al. | |
| 8,301,426 B2 | 10/2012 | Abasov et al. | |
| 8,301,429 B2 | 10/2012 | Hajibeygi et al. | |
| 8,315,845 B2 | 11/2012 | Lepage | |
| 8,335,677 B2 | 12/2012 | Yeten et al. | |
| 8,339,395 B2 | 12/2012 | Gruetzmacher | |
| 8,350,851 B2 | 1/2013 | Flew et al. | |
| 8,359,184 B2 | 1/2013 | Massonnat | |
| 8,359,185 B2 | 1/2013 | Pita et al. | |
| 8,374,974 B2 | 2/2013 | Chen et al. | |
| 8,386,227 B2 | 2/2013 | Fung et al. | |
| 8,401,832 B2 | 3/2013 | Ghorayeb et al. | |
| 8,412,501 B2 | 4/2013 | Oury et al. | |
| 8,412,502 B2 | 4/2013 | Moncorge et al. | |
| 8,423,338 B2 | 4/2013 | Ding et al. | |
| 8,428,919 B2 | 4/2013 | Parashkevov | |
| 8,429,671 B2 | 4/2013 | Wood et al. | |
| 8,433,551 B2 | 4/2013 | Fung et al. | |
| 8,437,999 B2 | 5/2013 | Pita et al. | |
| 8,447,525 B2 | 5/2013 | Pepper | |
| 8,452,580 B2 | 5/2013 | Strebelle | |
| 8,457,940 B2 | 6/2013 | Xi et al. | |
| 8,463,586 B2 | 6/2013 | Mezghani et al. | |
| 8,484,004 B2 | 7/2013 | Schottle et al. | |
| 8,489,375 B2 | 7/2013 | Omeragic et al. | |

(56) References Cited

U.S. PATENT DOCUMENTS

| | | |
|---|---|---|
| 8,494,828 B2 | 7/2013 | Wu et al. |
| 8,498,852 B2 | 7/2013 | Xu et al. |
| 8,504,341 B2 | 8/2013 | Cullick et al. |
| 8,510,242 B2 | 8/2013 | Al-Fattah |
| 8,515,678 B2 | 8/2013 | Pepper et al. |
| 8,515,720 B2 | 8/2013 | Koutsabeloulis et al. |
| 8,515,721 B2 | 8/2013 | Morton et al. |
| 8,521,496 B2 | 8/2013 | Schottle et al. |
| 8,532,967 B2 | 9/2013 | Torrens et al. |
| 8,532,969 B2 | 9/2013 | Li et al. |
| 8,543,364 B2 | 9/2013 | Liu et al. |
| 8,577,660 B2 | 11/2013 | Wendt et al. |
| 8,583,411 B2 | 11/2013 | Fung |
| 8,589,135 B2 | 11/2013 | Middya et al. |
| 8,599,643 B2 | 12/2013 | Pepper et al. |
| 8,606,524 B2 | 12/2013 | Soliman et al. |
| 8,612,194 B2 | 12/2013 | Horne et al. |
| 8,630,831 B2 | 1/2014 | Bratvedt et al. |
| 8,635,026 B2 | 1/2014 | Ameen |
| 8,639,444 B2 | 1/2014 | Pepper et al. |
| 8,655,632 B2 | 2/2014 | Moguchaya |
| 8,674,984 B2 | 3/2014 | Ran et al. |
| 8,676,557 B2 | 3/2014 | Ding et al. |
| 8,686,996 B2 | 4/2014 | Cheung et al. |
| 8,688,424 B2 | 4/2014 | Bourbiaux et al. |
| 8,694,261 B1 | 4/2014 | Robinson |
| 8,712,746 B2 | 4/2014 | Tillier et al. |
| 8,712,747 B2 | 4/2014 | Cullick et al. |
| 8,718,958 B2 | 5/2014 | Breton et al. |
| 8,718,993 B2 | 5/2014 | Klie |
| 8,731,887 B2 | 5/2014 | Hilliard et al. |
| 8,731,891 B2 | 5/2014 | Sung et al. |
| 8,738,294 B2 | 5/2014 | Ameen |
| 8,762,442 B2 | 6/2014 | Jeong et al. |
| 8,775,141 B2 | 7/2014 | Raphael |
| 8,775,144 B2 | 7/2014 | Han et al. |
| 8,776,895 B2 | 7/2014 | Li et al. |
| 8,780,671 B2 | 7/2014 | Sayers |
| 8,793,111 B2 | 7/2014 | Tilke et al. |
| 8,797,319 B2 | 8/2014 | Lin |
| 8,798,974 B1 | 8/2014 | Nunns |
| 8,798,977 B2 | 8/2014 | Hajibeygi et al. |
| 8,803,878 B2 | 8/2014 | Andersen et al. |
| 8,805,660 B2 | 8/2014 | Güyagüler et al. |
| 8,812,334 B2 | 8/2014 | Givens et al. |
| 8,818,778 B2 | 8/2014 | Salazar-Tio et al. |
| 8,818,780 B2 | 8/2014 | Calvert et al. |
| 8,843,353 B2 | 9/2014 | Posamentier et al. |
| 8,855,986 B2 | 10/2014 | Castellini et al. |
| 8,862,450 B2 | 10/2014 | Derfoul et al. |
| 8,898,017 B2 | 11/2014 | Kragas et al. |
| 8,903,694 B2 | 12/2014 | Wallis et al. |
| 8,935,141 B2 | 1/2015 | Ran et al. |
| 2002/0049575 A1 | 4/2002 | Jalali et al. |
| 2002/0177986 A1 | 11/2002 | Moeckel et al. |
| 2005/0171700 A1 | 8/2005 | Dean |
| 2006/0036418 A1* | 2/2006 | Pita .................. E21B 49/00 703/10 |
| 2006/0122780 A1 | 6/2006 | Cohen et al. |
| 2006/0269139 A1 | 11/2006 | Keskes et al. |
| 2007/0016389 A1 | 1/2007 | Ozgen |
| 2007/0277115 A1 | 11/2007 | Glinsky et al. |
| 2007/0279429 A1 | 12/2007 | Ganzer et al. |
| 2008/0126168 A1 | 5/2008 | Carney et al. |
| 2008/0133550 A1 | 6/2008 | Orangi et al. |
| 2008/0144903 A1 | 6/2008 | Wang et al. |
| 2008/0234988 A1 | 9/2008 | Chen et al. |
| 2008/0306803 A1 | 12/2008 | Vaal et al. |
| 2009/0071239 A1 | 3/2009 | Rojas et al. |
| 2009/0122061 A1 | 5/2009 | Hammon, III |
| 2009/0248373 A1 | 10/2009 | Druskin et al. |
| 2009/0306943 A1 | 12/2009 | Abdel-Khalik et al. |
| 2010/0132450 A1 | 6/2010 | Pomerantz et al. |
| 2010/0138196 A1 | 6/2010 | Hui et al. |
| 2010/0161300 A1 | 6/2010 | Yeten et al. |
| 2010/0179797 A1 | 7/2010 | Cullick et al. |
| 2010/0185428 A1 | 7/2010 | Vink |
| 2010/0191516 A1 | 7/2010 | Benish et al. |
| 2010/0312535 A1 | 12/2010 | Chen et al. |
| 2010/0324873 A1 | 12/2010 | Cameron |
| 2011/0004447 A1 | 1/2011 | Hurley et al. |
| 2011/0015910 A1 | 1/2011 | Ran et al. |
| 2011/0054869 A1 | 3/2011 | Li et al. |
| 2011/0066285 A1 | 3/2011 | Xu et al. |
| 2011/0115787 A1 | 5/2011 | Kadlec |
| 2011/0161133 A1 | 6/2011 | Staveley et al. |
| 2011/0310101 A1 | 12/2011 | Prange et al. |
| 2012/0059640 A1 | 3/2012 | Roy et al. |
| 2012/0065951 A1 | 3/2012 | Roy et al. |
| 2012/0143577 A1 | 6/2012 | Szyndel et al. |
| 2012/0158389 A1 | 6/2012 | Wu et al. |
| 2012/0159124 A1 | 6/2012 | Hu et al. |
| 2012/0215512 A1 | 8/2012 | Sarma |
| 2012/0215513 A1 | 8/2012 | Branets et al. |
| 2012/0232799 A1 | 9/2012 | Zuo et al. |
| 2012/0232859 A1 | 9/2012 | Pomerantz et al. |
| 2012/0232861 A1 | 9/2012 | Lu et al. |
| 2012/0232865 A1 | 9/2012 | Maucec et al. |
| 2012/0265512 A1 | 10/2012 | Hu et al. |
| 2012/0271609 A1 | 10/2012 | Laake et al. |
| 2012/0296617 A1 | 11/2012 | Zuo et al. |
| 2013/0035913 A1 | 2/2013 | Mishev et al. |
| 2013/0041633 A1 | 2/2013 | Hoteit |
| 2013/0046524 A1 | 2/2013 | Gathogo et al. |
| 2013/0073268 A1 | 3/2013 | Abacioglu et al. |
| 2013/0085730 A1 | 4/2013 | Shaw et al. |
| 2013/0090907 A1 | 4/2013 | Maliassov |
| 2013/0096890 A1 | 4/2013 | Vanderheyden et al. |
| 2013/0096898 A1 | 4/2013 | Usadi et al. |
| 2013/0096899 A1 | 4/2013 | Usadi et al. |
| 2013/0096900 A1 | 4/2013 | Usadi et al. |
| 2013/0110484 A1 | 5/2013 | Hu et al. |
| 2013/0112406 A1 | 5/2013 | Zuo et al. |
| 2013/0116993 A1 | 5/2013 | Maliassov |
| 2013/0118736 A1 | 5/2013 | Usadi et al. |
| 2013/0124097 A1 | 5/2013 | Thorne |
| 2013/0124173 A1 | 5/2013 | Lu et al. |
| 2013/0138412 A1 | 5/2013 | Shi et al. |
| 2013/0151159 A1 | 6/2013 | Pomerantz et al. |
| 2013/0166264 A1 | 6/2013 | Usadi et al. |
| 2013/0185033 A1 | 7/2013 | Tompkins et al. |
| 2013/0204922 A1 | 8/2013 | El-Bakry et al. |
| 2013/0231907 A1 | 9/2013 | Yang et al. |
| 2013/0231910 A1 | 9/2013 | Kumar et al. |
| 2013/0245949 A1 | 9/2013 | Abitrabi et al. |
| 2013/0246031 A1 | 9/2013 | Wu et al. |
| 2013/0289961 A1 | 10/2013 | Ray et al. |
| 2013/0304679 A1 | 11/2013 | Fleming et al. |
| 2013/0311151 A1 | 11/2013 | Plessix |
| 2013/0312481 A1 | 11/2013 | Pelletier et al. |
| 2013/0332125 A1 | 12/2013 | Suter et al. |
| 2013/0338985 A1 | 12/2013 | Garcia et al. |
| 2014/0012557 A1 | 1/2014 | Tarman et al. |
| 2014/0166280 A1 | 6/2014 | Stone et al. |
| 2014/0201450 A1 | 7/2014 | Haugen |
| 2014/0236558 A1 | 8/2014 | Maliassov |
| 2015/0120199 A1 | 4/2015 | Casey |

FOREIGN PATENT DOCUMENTS

| | | |
|---|---|---|
| WO | 2007/116008 | 10/2007 |
| WO | 2008/008121 | 1/2008 |
| WO | 2009/138290 | 11/2009 |

OTHER PUBLICATIONS

Aarnes, J. et al. (2004), "Toward reservoir simulation on geological grid models", 9th European Conf. on the Mathematics of Oil Recovery, 8 pgs.

Ahmadizadeh, M., et al., (2007), "Combined Implicit or Explicit Integration Steps for Hybrid Simulation", *Structural Engineering Research Frontiers*, pp. 1-16.

(56) References Cited

OTHER PUBLICATIONS

Bortoli, L. J., et al., (1992), "Constraining Stochastic Images to Seismic Data", Geostatistics, Troia, *Quantitative Geology and Geostatistics* 1, 325-338.

Byer, T.J., et al., (1998), "Preconditioned Newton Methods for Fully Coupled Reservoir and Surface Facility Models", SPE 49001, *1998 SPE Annual Tech. Conf., and Exh.*, pp. 181-188.

Candes, E. J., et al., (2004), "New Tight Frames of Curvelets and Optimal Representations of Objects with $C^2$ Singularities," *Communications on Pure and Applied Mathematics* 57, 219-266.

Chen, Y. et al. (2003), "A coupled local-global upscaling approach for simulating flow in highly heterogeneous formations", *Advances in Water Resources* 26, pp. 1041-1060.

Connolly, P., (1999), "Elastic Impedance," *The Leading Edge* 18, 438-452.

Crotti, M.A. (2003), "Upscaling of Relative Permeability Curves for Reservoir Simulation: An Extension to Areal Simulations Based on Realistic Average Water Saturations", SPE 81038, SPE Latin American and Caribbean Petroleum Engineering Conf., 6 pgs.

Donoho, D. L., Hou, X., (2002), "Beamlets and Multiscale Image Analysis," *Multiscale and Multiresolution Methods, Lecture Notes in Computational Science and Engineering* 20, 149-196.

Durlofsky, L.J. (1991), "Numerical Calculation of Equivalent Grid Block Permeability Tensors for Heterogeneous Porous Media", *Water Resources Research* 27(5), pp. 699-708.

Farmer, C.L. (2002), "Upscaling: a review", *Int'l. Journal for Numerical Methods in Fluids* 40, pp. 63-78.

Gai, X., et al., (2005), "A Timestepping Scheme for Coupled Reservoir Flow and Geomechanics in Nonmatching Grids", SPE 97054, *2005 SPE Annual Tech. Conf. and Exh.*, pp. 1-11.

Haas, A., et al., (1994), "Geostatistical Inversion—A Sequential Method of Stochastic Reservoir Modeling Constrained by Seismic Data," *First Break* 12, 561-569 (1994).

Holden, L. et al. (1992), "A Tensor Estimator for the Homogenization of Absolute Permeability", *Transport in Porous Media* 8, pp. 37-46.

Isaaks, E. H., et al., (1989), "Applied Geostatistics", *Oxford University Press*, New York, pp. 40-65.

Journel, A., (1992), "Geostatistics: Roadblocks and Challenges," *Geostatistics, Troia '92: Quanititative Geoglogy and Geostatistics* 1, 213-224.

Klie, H., et al., (2005), "Krylov-Secant Methods for Accelerating the Solution of Fully Implicit Formulations", SPE 92863, *2005 SPE Reservoir Simulation Symposium*, 9 pgs.

Mallat, S., (1999), "A Wavelet Tour of Signal Processing", *Academic Press*, San Diego, pp. 80-91.

Lu, B., et al., (2007), "Iteratively Coupled Reservoir Simulation for Multiphase Flow", SPE 110114, *2007 SPE Annual Tech. Conf and Exh.*, pp. 1-9.

Mosqueda, G., et al., (2007), "Combined Implicit or Explicit Integration Steps for Hybrid Simulation", *Earthquake Engng. & Struct. Dyn.*, vol. 36(15), pp. 2325-2343.

Strebelle, S., (2002), "Conditional simulations of complex geological structures using multiple-point statistics," *Mathematical Geology* 34(1), 1-21.

Sweldens, W., (1998), "The Lifting Scheme: A Construction of Second Generation Wavelets," *SIAM Journal on Mathematical Analysis* 29, 511-546.

Qi, D. et al. (2001), "An Improved Global Upscaling Approach for Reservoir Simulation", *Petroleum Science and Technology* 19(7 &8), pp. 779-795.

Verly, G., (1991), "Sequential Gaussian Simulation: A Monte Carlo Approach for Generating Models of Porosity and Permeability," Special Publication No. 3 of EAPG—Florence 1991 Conference, Ed.: Spencer, A.M.

Whitcombe, D. N., et al., (2002), "Extended elastic impedance for fluid and lithology prediction," *Geophysics* 67, 63-67.

White, C.D. et al. (1987), "Computing Absolute Transmissibility in the Presence of Fine-Scale Heterogeneity", SPE 16011, $9^{th}$ SPE Symposium in Reservoir Simulation, pp. 209-220.

Wu, X.H. et al. (2007), "Reservoir Modeling with Global Scaleup", SPE 105237, $15^{th}$ SPE Middle East Oil & Gas Show & Conf., 13 pgs.

Yao, T., et al., (2004), "Spectral Component Geologic Modeling: A New Technology for Integrating Seismic Information at the Correct Scale," Geostatistics Banff, *Quantitative Geology & Geostatistics* 14, pp. 23-33.

Younis, R.M., et al., (2009), "Adaptively-Localized-Continuation-Newton: Reservoir Simulation Nonlinear Solvers That Converge All the Time", SPE 119147, *2009 SPE Reservoir Simulation Symposium*, pp. 1-21.mos.

Zhang T., et al., (2006), "Filter-based classification of training image patterns for spatial Simulation," *Mathematical Geology* 38, 63-80.

Hendriks, E., et al., (1992) "Application of a Reduction Method to Phase-Equilibria Calculations", 1992, *Fluid Phase Equilibria*, v74, pp. 17-34.

Voskov, D., et al. (2009) "Tie-Simplex Based Mathematical Framework for Thermodynamical Equilibrium Computation of Mixtures with an Arbitrary Number of Phases", *Fluid Phase Equilibria*, v283, pp. 1-11.

Rasmussen, C., et al., (2006) "Increasing the Computational Speed of Flash Calculations with Applications for Compositional, Transient Simulations", SPE Reservoir Evaluation and Engineering, v9, No. 1, pp. 32-38.

Kurzak, J., et al (2007), "Implemenatation of mixed precision in solving systems of linear equations on the Cell processor", *Concurrency and Computation; Practice and Experience*, vol. 19, pp. 1371-1385.

Wong, T. W., et al. (1990), "Relationship of the Volume-Balance Method of Compositional Simulation to the Newton-Raphson Method", *SPE Reservoir Engineering*, August SPE21462, pp. 415-422.

\* cited by examiner

OPTIMIZED MATRIX AND VECTOR OPERATIONS IN INSTRUCTION LIMITED ALGORITHMS THAT PERFORM EOS CALCULATIONS

CROSS-REFERENCE TO RELATED APPLICATION

This application is the National Stage entry under 35 U.S.C. 371 of PCT/US2012/047890, that published as Intl. Patent App. Publication No. 2013/039606 and was filed on 23 Jul. 2012, which claims the benefit of U.S. Provisional Patent Application 61/535,131, filed 15 Sep. 2011, entitled OPTIMIZED MATRIX AND VECTOR OPERATIONS IN INSTRUCTION LIMITED ALGORITHMS THAT PERFORM EOS CALCULATIONS, each of which is incorporated by reference herein in its entirety, for all purposes.

FIELD OF THE INVENTION

The present techniques relate to instruction limited algorithms with optimized matrix and vector operations. In particular, an exemplary embodiment of the present techniques relate to a system and method for performing equation of state (EOS) calculations.

BACKGROUND

This section is intended to introduce various aspects of the art, which may be associated with embodiments of the disclosed techniques. This discussion is believed to assist in providing a framework to facilitate a better understanding of particular aspects of the disclosed techniques. Accordingly, it should be understood that this section is to be read in this light, and not necessarily as admissions of prior art.

Instruction limited algorithms may occur in various industries. For example, instruction limited algorithms may occur in areas such as 3D graphics analysis, encryption, data mining, compression, signal processing, image processing, chain rule evaluation, numerical methods such as finite element and finite volume analysis, seismic pattern recognition, and equation of state (EOS) calculations.

EOS calculations can be used to model phase behavior, which may have a significant effect on reservoir performance. The rate at which a petroleum mixture can flow through porous media is influenced by the number of phases, the viscosity of each phase, and the density of each phase. In general, phase behavior and phase properties are functions of temperature, pressure, and composition. In some cases, the compositional effects associated with phase behavior are weak and can be ignored. This may occur with petroleum fluids referred to as black oils. Modeling a reservoir containing black oils may be referred to as black oil simulation.

In other cases, the compositional effects may be accounted for. To account for compositional effects, the petroleum industry typically uses an equation of state (EOS). Modeling the reservoir with compositional effects may be referred to as a compositional simulation. A number of advanced recovery mechanisms can rely on the compositional effects of phase behavior.

EOS calculations may cause compositional simulations to be considerably slower than black oil simulations. EOS calculations typically involve determining the number of phases and the composition of each phase. Although an individual EOS calculation can be "cheap" to perform, it may be repeated billions of times over the course of a reservoir simulation. Thus, EOS calculations can consume more than 50% of total simulation time. Moreover, EOS calculations are computationally intensive and their cost may increase rapidly with the increase of the number of components in the mixture.

In order to improve computational speed, parallel reservoir simulators may be used. When using parallelization, a large problem is broken down into smaller subproblems, and then distributed between a number of processing cores. The subproblems may not be independent, and the cores can communicate to synchronize their work. The cores may communicate through shared memory or through high speed networks. In parallel computing environments, memory bandwidth and network communication are typical speed-limiting factors.

D. Voskov and H. Tchelepi, "Tie-Simplex Based Mathematical Framework for Thermodynamical Equilibrium Computation of Mixtures with an Arbitrary Number of Phases", Fluid Phase Equilibria, Volume 283, 2009, pp. 1-11 states that a tie-line based parameterization method improves both the accuracy of the phase-behavior representation as well as the efficiency of equation of state (EOS) computations in compositional flow simulation. For immiscible compositional simulation, the technique is stated to use compositional space adaptive tabulation to avoid most of the redundant EOS calculations. However, matrix and vector operations are not optimized.

C. Rasmussen, et al., "Increasing the Computational Speed of Flash Calculations with Applications for Compositional, Transient Simulations", SPE Reservoir Evaluation and Engineering, Volume 9, Number 1, 2009, pp. 32-38 states that in a conventional flash calculation, the majority of the simulation time is spent on stability analysis. The technique is stated to decide when it is justified to bypass the stability analysis, and does not optimize matrix and vector operations in instruction limited algorithms that perform EOS calculations.

E. Hendriks and A. Van Bergen, "Application of a Reduction Method to Phase-Equilibria Calculations", Fluid Phase Equilibria, Volume 74, 1992, pp. 17-34 states that for specific thermodynamic models, the number of equations to solve a set of nonlinear equations relating to phase equilibrium of a mixture can be reduced. Problem size and the computational effort may be reduced through a variable transformation. Additionally, the smallest number of reduced variables that properly describe the phase behavior of the mixture may be determined. However, matrix and vector operations in instruction limited algorithms that perform EOS calculations are not optimized.

SUMMARY

An exemplary embodiment of the present techniques provides a method of optimizing matrix and vector operations in instruction limited algorithms that perform EOS calculations. Each matrix associated with an EOS stability equation and an EOS phase split equation may be divided into a number of heterogeneous or homogenous sized tiles. Each vector associated with the EOS stability equation and the EOS phase split equation may be divided into a number of strips. The tiles and strips may be organized in main memory, cache, or registers, and the matrix and vector operations associated with successive substitutions and Newton iterations may be performed in parallel using the tiles and strips.

An exemplary embodiment of the present techniques provides a system that includes a processor and a tangible, machine-readable storage medium that stores machine-readable instructions for execution by the processor, the machine-readable instructions including code that, when executed by the processor, is adapted to cause the processor to divide each matrix associated with an EOS stability equation and an EOS phase split equation into a number of tiles, wherein the tile size is heterogeneous or homogenous. The code may, when executed by the processor, be adapted to cause the processor to divide each vector associated with the EOS stability equation and the EOS phase split equation into a number of strips, and store the tiles and strips in main memory, cache, or registers. Additionally, the code may, when executed by the processor, be adapted to cause the processor to perform the matrix and vector operations associated with successive substitutions and Newton iterations in parallel using the tiles and strips.

An exemplary embodiment of the present techniques provides a non-transitory, computer readable medium comprising code configured to direct a processor to divide each matrix associated with an EOS stability equation and an EOS phase split equation into a number of tiles, wherein the tile size is heterogeneous or homogenous. Each vector associated with the EOS stability equation and the EOS phase split equation into a number of strips. The tiles and strips may be stored in main memory, cache, or registers, and the matrix and vector operations associated with successive substitutions and Newton iterations may be performed in parallel using the tiles and strips.

BRIEF DESCRIPTION OF THE DRAWINGS

Advantages of the present techniques may become apparent upon reviewing the following detailed description and drawings of non-limiting examples of embodiments in which.

DETAILED DESCRIPTION

Figure 1:
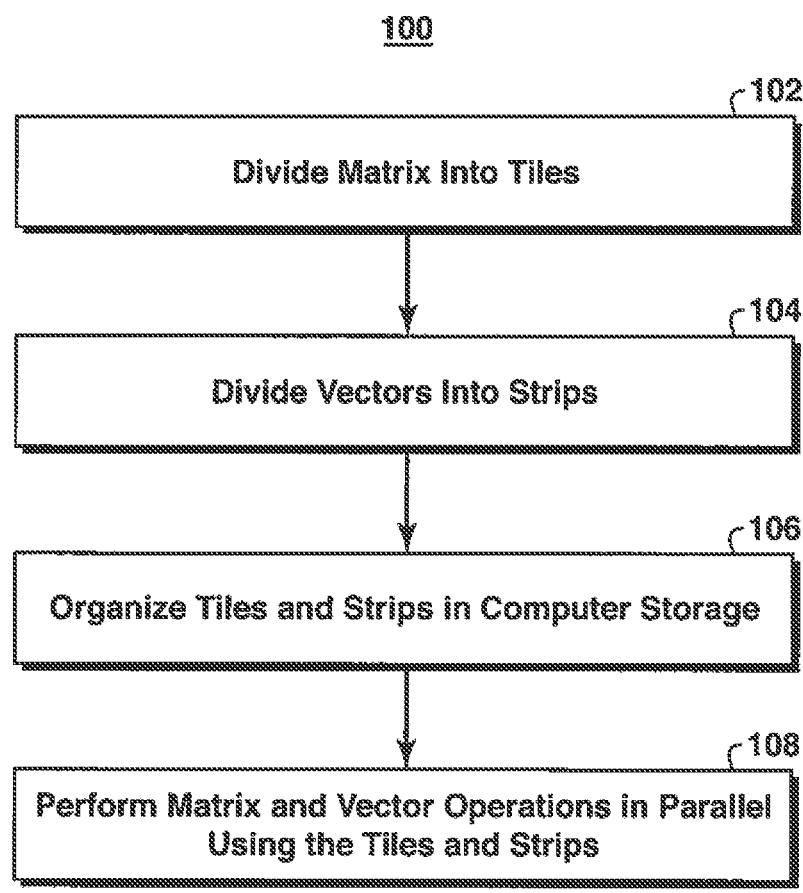
FIG. 1 is a process flow diagram summarizing a method of optimizing matrix and vector operations in instruction limited algorithms that perform EOS calculations according to an embodiment of the present techniques.

In the following detailed description section, specific embodiments are described as examples. However, to the extent that the following description is specific to a particular embodiment or a particular use, this is intended to be for exemplary purposes only and simply provides a description of the exemplary embodiments. Accordingly, the present techniques are not limited to embodiments described herein, but rather, it includes all alternatives, modifications, and equivalents falling within the spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent.

The term "cell" refers to a collection of faces, or a collection of nodes that implicitly define faces, where the faces together form a closed volume. Additionally, the term "face" refers to an arbitrary collection of points that form a surface.

The term "communication limited" refers to when the execution speed of an algorithm is limited by the speed at which processing cores are able to communicate and synchronize their work through shared memory or high speed networks.

The term "memory limited" refers to when the execution speed of an algorithm is limited by the rate at which data moves between memory and the CPU.

The term "instruction limited" refers to when the execution speed of an algorithm is limited by the rate at which instructions are processed by the CPU.

The term "compositional reservoir simulation" refers to a simulation used to simulate recovery processes for which there is a need to know the compositional changes in at least part of the reservoir. For example, compositional simulations can be helpful in studying (1) depletion of a volatile oil or gas condensate reservoir where phase compositions and properties vary significantly with pressure below bubble or dew point pressures, (2) injection of non-equilibrium gas (dry or enriched) into a black-oil reservoir to mobilize oil by vaporization into a more mobile gas phase or by condensation through an outright (single-contact) or dynamic (multiple-contact) miscibility, and (3) injection of $CO_2$ into an oil reservoir to mobilize oil by miscible displacement and by oil viscosity reduction and oil swelling.

Compositional reservoir simulations that use an EOS to describe the phase behavior of multi-component fluid mixtures may be time consuming due to the large number of iterative phase equilibrium calculations and the large number of flow equations to solve. The number of equations that are solved in EOS calculations is proportional to the number of components in the fluid. Since a reservoir fluid can contain hundreds of pure components, it may not be practical to perform compositional simulations in which all reservoir components are used in the calculations. It is therefore desirable to keep the number of components used in describing a fluid mixture to a minimum.

The term "computer component" refers to a computer-related entity, hardware, firmware, software, a combination thereof, or software in execution. For example, a computer component can be, but is not limited to being, a process running on a processor, a processor, an object, an executable, a thread of execution, a program, and a computer. One or more computer components can reside within a process or thread of execution and a computer component can be localized on one computer or distributed between two or more computers.

The terms "equation of state" or "EOS" refer to an equation that represents the phase behavior of any fluid, including hydrocarbons. In a reservoir simulation, an equation of state may be used for hydrocarbon phases only, and empirical correlations may be used to describe the aqueous phase. The EOS may be used in computer-based modeling and simulation techniques to create a model for estimating the properties and/or behavior of the hydrocarbon fluid in a reservoir of interest. Once an EOS model is defined, it can be used to compute a wide array of properties of the petroleum fluid of the reservoir, such as gas-oil ratio (GOR) or condensate-gas ratio (CGR), density of each phase, volumetric factors and compressibility, heat capacity and saturation pressure (bubble or dew point). Thus, the EOS model can be solved to obtain saturation pressure at a given temperature. Moreover, GOR, CGR, phase densities, and volumetric factors are byproducts of the EOS model. Transport properties, such as conductivity, diffusivity, or viscosity, can be derived from properties obtained from the EOS model, such as fluid composition.

The terms "non-transitory, computer-readable medium", "tangible machine-readable medium" or the like refer to any tangible storage that participates in providing instructions to a processor for execution. Such a medium may take many forms, including but not limited to, non-volatile media, and volatile media. Non-volatile media includes, for example, NVRAM, or magnetic or optical disks. Volatile media includes dynamic memory, such as main memory. Computer-readable media may include, for example, a floppy disk, a flexible disk, hard disk, magnetic tape, or any other magnetic medium, magneto-optical medium, a CD-ROM, any other optical medium, a RAM, a PROM, and EPROM, a FLASH-EPROM, a solid state medium like a holographic memory, a memory card, or any other memory chip or cartridge, or any other physical medium from which a computer can read. When the computer-readable media is configured as a database, it is to be understood that the database may be any type of database, such as relational, hierarchical, object-oriented, and/or the like. Accordingly, exemplary embodiments of the present techniques may be considered to include a tangible storage medium or tangible distribution medium and prior art-recognized equivalents and successor media, in which the software implementations embodying the present techniques are stored.

The term "latency" refers to a measure of time delay experienced in a system.

The term "phase behavior" refers to how a fluid mixture splits into two or more phases as a function of pressure, temperature, and composition. A mixture's phase may be either solid, vapor, liquid, or supercritical.

The term "phase" refers to a chemically or physically uniform quantity of matter that can be separated mechanically from a non-homogenous mixture. It may consist of a single substance or a mixture of substances. Generally, the four phases of matter are solid, liquid, gas, and plasma. However, the term "phase" is also used to describe other properties or states of matter, such as separated layers of non-miscible liquids, colloidal substances or mixtures, and amorphous solids. In hydrocarbon production, aqueous (water), liquid (oil), and vapor (gas) phases are often present.

The term "property" refers to data representative of a characteristic associated with different topological elements on a per element basis. Generally, a property could be any computing value type, including integer and floating point number types or the like. Moreover, a property may comprise vectors of value types. Properties may only be valid for a subset of a geometry object's elements. Properties may be used to color an object's geometry. The term "property" may also refer to characteristic or stored information related to an object. Application of the appropriate definition is intuitive to one skilled in the art of computer science.

The term "specialization" refers to generating a version of a computer program or algorithm for a specific set of input parameters.

The term "thread" refers generally to an instance of execution of a particular program using particular input data. Parallel threads may be executed simultaneously using different processing engines, allowing more processing work to be completed in a given amount of time.

Overview

While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various serially occurring actions, it is to be appreciated that various actions could occur concurrently, substantially in parallel, and/or at substantially different points in time.

An embodiment provides a method for optimizing matrix and vector operations in instruction limited algorithms on arbitrary hardware architectures. Computer algorithms may contain various matrix and vector operations. The speed of any computer algorithm is limited by three possible bottlenecks: instruction throughput, memory throughput, and in the case of clusters, communication throughput. Most scientific algorithms are either memory or communication limited by the hardware on which they are processed. However, EOS calculations are typically instruction limited, meaning the ultimate speed of EOS algorithms may be determined by the rate at which the hardware is able to execute the individual operations. As a result, optimization may involve efficiently moving data between cache and the hardware registers where calculations take place. This data may include matrix and vector data.

Figure 3:
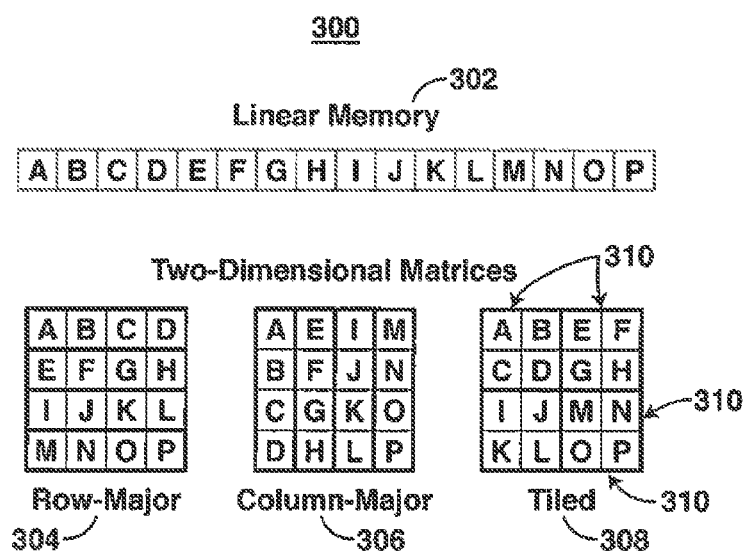
FIG. 3 is a diagram illustrating how two-dimensional matrices map into linear memory using three different storage formats according to an embodiment of the present techniques.

FIG. 1 is a process flow diagram summarizing a method 100 of optimizing matrix and vector operations in instruction limited algorithms that perform EOS calculations according to an embodiment of the present techniques. At block 102, each matrix is divided into a plurality of tiles. A tile may be generally described as a smaller sub-matrix formed from the original, larger matrix. FIG. 3 further describes dividing matrices into tiles. Additionally, each matrix may be associated with an EOS stability equation or an EOS phase split equation with either a heterogeneous or homogeneous tile size. At block 104, each vector is divided into a plurality of strips. Like a tile, a strip may be generally described as a smaller sub-vector, formed from the original, larger vector. Each vector may be associated with the EOS stability equation or an EOS phase split equation.

At block 106, the tiles and strips may be organized in computer storage, such as main memory, cache, or registers. Before the data contained in the tiles and strips can be operated upon, at least one of the operands is transferred to the hardware registers. Unnecessary data transfers may slow down the CPU execution speed. To make data transfers more efficient, modern hardware architectures may use a cache memory as a buffer between main memory and registers, as cache memory can be faster and have a lower latency compared to main memory. At block 108, matrix and vector calculations may be performed in parallel using tiles and strips, with all matrix and vector calculations expressed in terms of tile and strip operations. Further, in EOS calculations, the matrix and vector operations associated with successive substitution and Newton iterations may be performed in parallel using the tiles and strips. FIGS. 6-9 further describe successive substitutions as well as Newton iterations. Parallelization can be used to speed up the individual tile and strip operations or to perform multiple tile and strip operations simultaneously.

Figure 2:
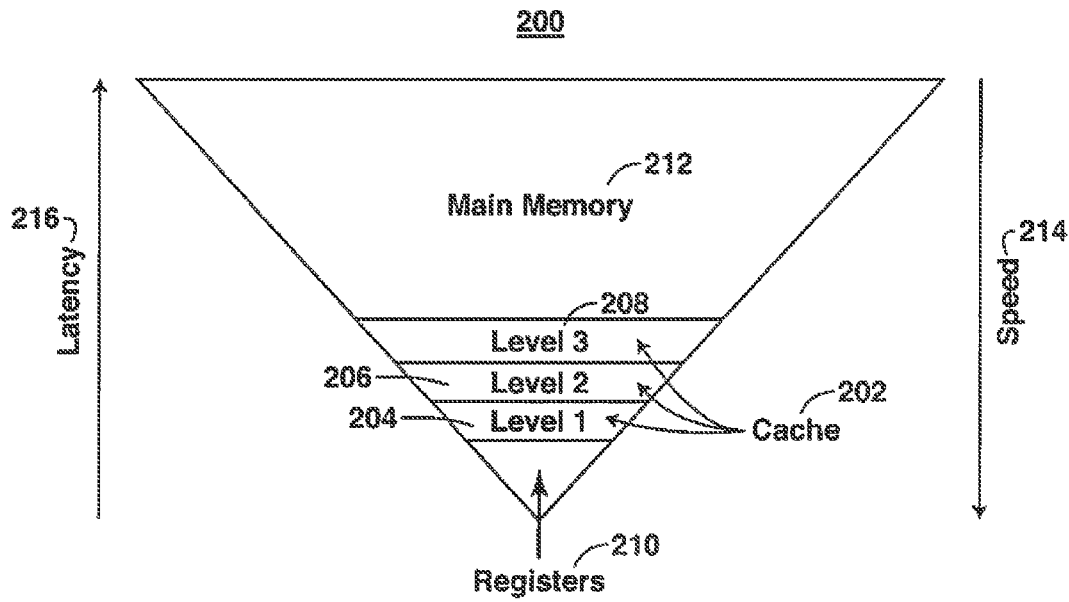
FIG. 2 is a diagram that shows a memory hierarchy according to an embodiment of the present techniques.

FIG. 2 is a diagram 200 that shows a memory hierarchy according to an embodiment of the present techniques. As illustrated by diagram 200, modern CPUs typically have a multilevel cache hierarchy 202. Diagram 200 has three levels of cache, Level 1 at 204, Level 2 at 206, and Level 3 at 208. Cache Level 1 at 204 is closest to the registers 210, and cache Level 3 is closest to main memory 212. Accordingly, speed 214 increases and latency 216 decreases the closer to the registers 210 that data is stored. Every data transfer between main memory 212 and the multilevel cache hierarchy 202, within the multilevel cache hierarchy 202 itself, or between the multilevel cache hierarchy 202 and registers 210 takes a finite amount of time. Unnecessary data transfers may cause the hardware to waste several computer clock cycles waiting for data to process. On modern CPUs, data associated with small problems such as EOS calculations may fit completely within cache memory levels. Accordingly, data transfer issues on modern CPUs typically occur between cache memory levels and registers. Conversely, modern GPUs typically have a significantly smaller amount of cache memory available. Thus, data transfer issues on modern GPUs typically occur between cache memory levels and main memory.

Optimization Techniques

Optimization techniques to address instruction throughput include tiling, per-tile optimizations, specialization, strips, and vectorization. Implementing them efficiently may be a challenge because although matrices are two-dimensional data structures, matrices are typically stored in one-dimensional memory. The manner in which a matrix is stored in memory influences the number of data transfers needed to perform a matrix operation. As discussed above, unnecessary data transfers may cause the hardware to waste several computer clock cycles waiting for data to process.

Generally, there are two types of computer architectures available, scalar and vector. Scalar architectures may operate on a single data element at a time, while vector architectures may operate on several data elements simultaneously. The central processing unit (CPU) found in various computer and mobile devices is an example of a scalar hardware architecture. The graphical processing unit (GPU) found on computer video cards is an example of a vector hardware architecture. Both architectures may consist of several cores between which the work can be divided. Division of the work can achieved by splitting the work into smaller subtasks called threads.

FIG. 3 is a diagram 300 illustrating how two-dimensional matrices 304-308 map into linear memory 302 using three different storage formats according to an embodiment of the present techniques. One common method of storing a matrix is to place rows of data next to each other. This is referred to as a row-major storage format, and is shown at row-major matrix 304. Alternatively, one can place columns of data next to each other to obtain a column-major storage format, shown at column major matrix 306. These two storage formats may yield a high number of unnecessary data transfers between hardware registers and cache memory when applied to various calculations. The data transfer issue may be resolved by dividing the matrix into smaller sub-matrices called tiles, which are shown at tiled matrix 308. The size of an individual tile 310 is selected to ensure that at least one operand in each arithmetic operation and the intermediate results associated with a tile operation remain in the registers. In this manner, data transfer between registers and cache may be minimized, and as a result, a larger fraction of the CPU cycles may be spent on computations. Matrices may be subdivided into homogeneous tiles or heterogeneous tiles. Using heterogeneous tiles may allow matrices of any size to use a tiled storage format.

Figure 4:
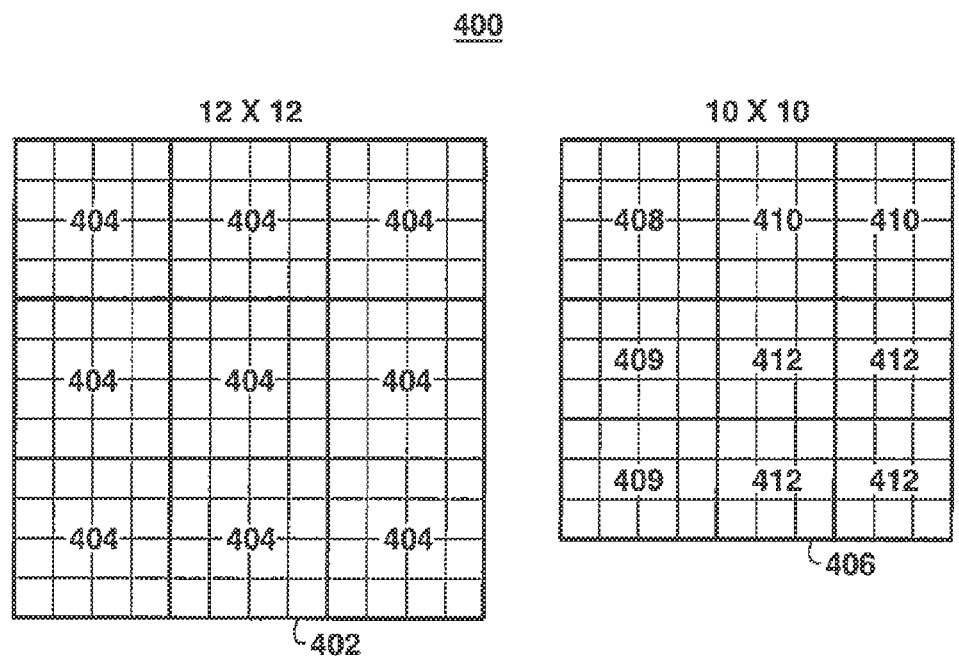
FIG. 4 is a diagram that shows homogeneous tiles and heterogeneous tiles according to an embodiment of the techniques.

FIG. 4 is a diagram 400 that shows homogeneous tiles and heterogeneous tiles according to an embodiment of the present techniques. A matrix 402 contains tiles at reference number 404, each of which is the same size. Thus, the tiles of matrix 402 are homogeneous tiles. A matrix 406 contains tiles at reference number 408, tiles at reference number 409, tiles at reference number 410, and tiles at reference number 412. The tiles at reference number 408, the tiles at reference number 409, the tiles at reference number 410, and the tiles at reference number 412 vary in size. Thus, the tiles of matrix 402 are heterogeneous tiles. Matrices with homogenous tiles as well as matrices with heterogeneous tiles may be used in the present techniques. Moreover, the tiles may be organized or stored in the main memory, cache, or registers in a sequential or interleaved fashion. Strips, as discussed herein, may also be organized or stored in the main memory, cache, or registers in a sequential or interleaved fashion. Further, the tiles may be implemented using a scalar hardware architecture or a vector hardware architecture.

The size of the tiles, whether homogenous or heterogeneous, may be selected in order to minimize data transfer between different levels of the memory hierarchy within a single hardware architecture. When the tiles are homogeneous, the matrix size may be restricted to be an integer multiple of the tile size. This integer multiple matrix size can be achieved for any matrix by padding the matrix with dummy elements to a size that allows for the use of homogeneous tiles. However, unless matrix size is significantly larger than tile size, padding the matrix may significantly increase the computational time of a matrix operation. In this scenario, using heterogeneous tiles may eliminate this increase in computational time because the matrix can be divided into tiles without the use of padding.

Using tiles allows for optimization on a per-tile basis. In other words, per-tile optimization facilitates using a divide and conquer approach, where optimizing the matrix operations may be reduced to operating a handful of tile operations. For example, EOS-specific tile operations may be used to calculate fugacity derivatives and for construction of the Jacobian matrix in the Newton algorithms. The Newton algorithm also uses linear solvers. In EOS calculations, the Jacobian matrices are dense, such that most elements are nonzero. Two common algorithms solving linear sets of equations with dense Jacobian matrices are Gaussian elimination and Lower-Upper (LU) factorization, which can both be expressed in terms of tile operations. Per-tile optimization may reduce loop overhead and jump overhead. The loop overhead refers to the computational overhead associated with each loop. This overhead may be a result of conditions that must be evaluated during each iteration of the loop to determine whether or not a subsequent iteration of the loop will occur. Likewise, the jump overhead refers to the computational overhead associated when a computer program encounters an instruction telling it to jump from one line in the code to another. Jump overhead typically occurs as a result of function calls, loop iterations, or when the execution path depends on the outcome of some test (branching). Such jump instructions can slow down execution speed considerably unless the jump overhead is small compared to the time it takes to execute the code between jumps.

In order to reduce loop and jump overhead, modern compilers may "unroll" loops, if possible. When unrolling a loop, the compiler may evaluate the condition controlling the number of iterations of the loop, and translate the loop into corresponding non-loop instructions. For example, in EOS algorithms, the number of loop iterations may be controlled by the number of components in the mixture. Typically, the number of components in the mixture is not available to the compiler, preventing loop unrolling from taking place. In contrast, tiles associated with EOS calculations may have a predetermined size, and each loop that has been associated with a tile operation and is based on tile size can be completely unrolled. Similarly, in EOS calculations, each loop that has been associated with a strip and is based on the strip size can be completely unrolled.

Another optimization technique may be to use register variables. A common programming practice when using data structures such as vectors and matrices is to use pointers that point to the address of the first data element in the structure. Using this address as a reference, the algorithm knows how to access other data elements. The use of pointers in this manner can lead to unnecessary data transfer between hardware registers and cache memory, especially when the compiler assumes that multiple pointers may point to the same data address. To avoid data inconsistencies, any data element modified in the registers may be copied to cache memory to ensure that every pointer has access to the latest update. Similarly, a data element may be copied from cache memory every time it is to be operated upon to make sure the register variable is up to date. Excess data transfers can be avoided by using register variables for intermediate calculations or to hold copies of input data. Thus, data in the register variables are not accessible by pointers, and data is no longer copied unnecessarily between registers and cache memory.

Optimization with specialization involves making several versions of the optimized algorithms to accommodate unrolling loops that are dependent on an unknown number of tiles, as opposed to loops that are dependent on tile size. As discussed herein, loops that are based on tile size may be unrolled, as tile size is known to the compiler. However, the number of tiles may be unknown. Thus, loops depending on the number of tiles may not be unrolled. Specialization provides an algorithm for each number of tiles of interest. Each algorithm version has a known number of tiles, which allows loops based on the number of tiles to be unrolled. Specialization also applies to loops associated with vector operations, and can be automated using templates. For example, unrolling loops through specialization may occur when a number of different EOS algorithms are generated for mixtures with different numbers of components.

Tiling does not apply to vectors, as vectors are one-dimensional data structures. In order to reduce loop and jump overhead associated with vectors, the vectors can be divided into strips. Using strips facilitates loop-unrolling and the use of register variables in the same manner as tiles. For example, loops may be unrolled based on the strip size. Strips take advantage of various algorithms that involve vector operations, separate and distinct from vectorization, as discussed herein.

Single instruction multiple data (SIMD) and single instruction multiple threads (SIMT) vectorization may also optimize instruction limited algorithms. A SIMD instruction simultaneously operates on multiple data elements. Most modern CPUs implement SIMD instructions, often referred to as vector extensions. With GPUs however, there are both SIMD and SIMT architectures. SIMD instructions may be executed by a single processing core while SIMT instructions are executed by multiple processing cores. Both SIMD and SIMT instructions may be used to speed up instruction limited algorithms.

Figure 5:
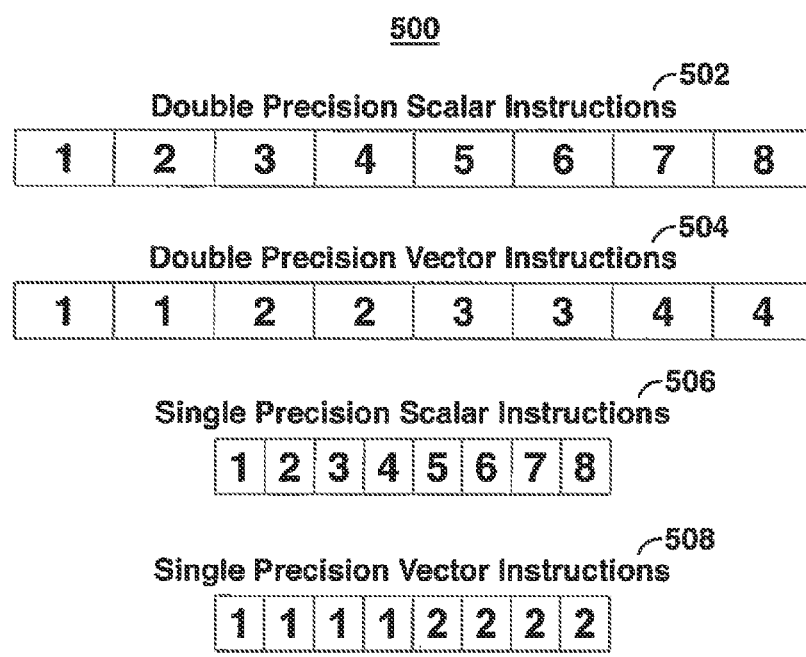
FIG. 5 is a diagram that illustrates how the number of instructions may be reduced by SIMD/SIMT vectorization according to an embodiment of the present techniques.

FIG. 5 is a diagram 500 that illustrates how the number of instructions may be reduced by SIMD/SIMT vectorization according to an embodiment of the present techniques. Each array 502-508 represents a data segment which may be operated upon. The numbers identify the instructions operating on the individual data elements. Double precision scalar instructions are shown at reference number 502 and double precision vector instructions are shown at reference number 504. Single precision scalar instructions are shown at reference number 506, and single precision vector instructions are shown at reference number 508. For example, assume the size of each vector to be 128 bit. The same operation may be performed on each element in an array. Using double precision vectors, each operation operates on two data elements, reducing the number of instructions by a factor of two. Single precision vectors contain twice the number of data elements and the number of instructions is reduced by a factor of four. Thus, single precision, double precision, or mixed precision vectorization of data elements may be used with SIMD or SIMT vector instructions. Further, single precision, double precision, or mixed precision vectorization may be used to perform EOS calculations in parallel, where each EOS calculation may correspond to a different mixture.

In instruction limited algorithms, switching from double to single precision may not speed up calculations. Although the size of the data elements is reduced, the number of instructions remains the same. Taking advantage of single precision involves using vector instructions. Speed-up occurs with single precision vector instructions because single precision vectors hold twice as many elements when compared to double precision vectors. Thus, each instruction operates on twice the number of data elements.

SIMD/SIMT vectorization can be used to speed up individual tile and strip operations. In this scenario, the tiles and strips may be an integer multiple of SIMD/SIMT vector length. Consequently, this approach is used for short SIMD/SIMT vectors. Alternatively, SIMD/SIMT vectorization can be used to perform several tile and strip operations in parallel. In this scenario, the tiles and strips may be interleaved, such that each SIMD/SIMT vector instruction accesses single elements from each tile or strip. Since the data elements accessed by each SIMD/SIMT vector instruction belong to separate tiles or strips, the a SIMD/SIMT vectorization with tile and strip operations in parallel may not add any restrictions to vector or strip size, and can be used with SIMD/SIMT vectors of arbitrary length. In this manner, single precision, double precision, or mixed precision vectorization of tile and strip operations associated with EOS calculations, or data elements within the tiles and strips associated with EOS calculations, may use single instruction multiple data or single instruction multiple thread vector instructions. The vector registers of most modern CPUs can hold two double precision or four single precision elements, or even four double precision or eight single precision elements.

EXAMPLES

The various optimizations described herein can be combined in many different ways and may be tailored for the particular hardware on which the algorithm may run. For descriptive purposes, three examples are illustrated. However, the examples are for descriptive purposes and are not intended to limit the present techniques. As such, the first example may be designed for hardware without SIMD instructions, the second example may be designed for hardware with short SIMD vectors, and the third example may be designed for hardware with SIMD vectors of arbitrary length.

I. In the first example, the hardware may not support SIMD instructions. All matrices may be organized into tiles, and data inside the tiles may use either a row-major, column-major, or tiled storage format as described herein. Tiles inside the matrices may be organized or stored sequentially in main memory, cache, or registers. The tile size may be selected in a manner that uses the registers as efficiently as possible. Currently, typical desktop and workstation CPUs may have 16 registers, thus three-by-three and four-by-four are reasonable tile sizes. Using homogeneous tile sizes introduces granularity in the number of components. For example, using a tile size of n-by-n may drive the number of components to be a multiple of n. For mixtures where the number of components is not a multiple of n, the adding trace amounts of dummy components may allow the component total to be a multiple of n. To avoid excessive padding, tile sizes may be kept small, even when using hardware with a large number of registers.

Alternatively, padding can be avoided completely by dividing matrices into tiles of different sizes. Tile operations performed may include linear algebra operations like matrix-matrix multiplication, matrix-vector multiplication, and matrix inverse. In addition, the various sets of linear equations may be solved using a linear solver based on optimized tile operations.

Additionally, when used on hardware without SIMD instructions, vectors may be organized into strips. Strip length may match the tile size. For example, using a tile size of n-by-n implies using a strip length of n. Vector operations may be expressed as a series of strip operations. This allows partial unrolling of corresponding loops as described herein. Other loops may be unrolled using specialization. However, within the linear solver, some loops may be too complex for the compiler to unroll. These loops may be unrolled manually or through the use of templates.

II. In the second example, the hardware may support SIMD instructions on short vectors. Accordingly, SIMD instructions may be used to speed up the individual tile and strip operations through vectorization as discussed herein. This implies that computations related to several data elements may be performed in parallel, and both single and double precision SIMD vectors may be used. All matrices may be organized into tiles, and data inside the tiles may use either a row-major or column-major storage format. The tile size may be selected in a manner that uses the registers as efficiently as possible. Since vectorization is used to speed up the individual tile operations, the tile size may be selected to be an integer multiple of vector length, even if the tile sizes are heterogeneous. Typical desktop and workstation CPUs that implement SIMD vectors can hold two double precision or four single precision elements, or even four double precision or eight single precision elements. Additionally, strip length may also be an integer multiple of vector length and can be chosen to match the tile size.

In the second example, tile operations may be redesigned to work in terms of SIMD instructions. In addition to matrix-matrix multiplication, matrix vector multiplication, and matrix inverse operations, an algorithm to calculate the matrix transpose may also be implemented. Apart from using the SIMD based tile-operations, the linear solver may be nearly identical to the first example. However, for the second example, one main difference is that SIMD vector alignment inside each tile has to be taken into account. Horizontal SIMD vector alignment implies that all data elements in a SIMD vector belong to the same row in a tile. Similarly, vertical SIMD vector alignment implies that all data elements in a SIMD vector belong to the same column in a tile. The individual tile operations assume a particular SIMD vector alignment and occasionally, the SIMD vector alignment inside a tile has to be flipped. This can be done by using the matrix transpose operation. Strip operations may be expressed in terms of SIMD instructions, and specialization may occur with loops unrolled manually or through the use of templates.

In a partial implementation of the second example, the optimized algorithms were tested by performing EOS calculations on a twenty component mixture and recording average execution times for various sub-algorithms. Optimizations related to using strips were not included. Table 1 shows the execution times obtained for the stability and phase-split algorithms. The implemented optimizations led to an average speed-up of a factor of 2.2.

TABLE 1

Execution Times for Stability and Phase-Split Algorithms

| Algorithm | Before | After | Speed-up |
|---|---|---|---|
| Stability | 107 µs | 42.5 µs | 2.51x |
| Phase-Split | 60.6 µs | 32.8 µs | 1.85x |
| Total | 168 µs | 75.9 µs | 2.21x |

The speed-up was largely due to a significant performance improvement in the Newton algorithms performed in the stability and phase split algorithms. Table 2 shows the performance improvement seen for the both the successive substitution and Newton algorithms as applied to the stability and phase split algorithms.

TABLE 2

Execution Times for Successive Substitution and Newton Algorithms

| Algorithm | Before | After | Speed-up |
|---|---|---|---|
| Successive Substitution (S) | 24.7 µs | 19.7 µs | 1.25x |
| Successive Substitution (PS) | 22.8 µs | 19.1 µs | 1.19x |

TABLE 2-continued

Execution Times for Successive Substitution
and Newton Algorithms

| Algorithm | Before | After | Speed-up |
|---|---|---|---|
| Newton (S) | 82.0 µs | 22.8 µs | 3.60x |
| Newton (PS) | 37.8 µs | 13.7 µs | 2.76x |

S = Stability, PS = Phase-Split

The significant speed-up in the Newton algorithms was anticipated because several of the matrix operations take place in the Newton algorithms, and the matrix operations can greatly benefit from the optimizations described herein. The Newton algorithms call a handful of fundamental sub-algorithms, such as the Jacobian and linear solver, while calculating the EOS parameters involves a matrix-vector multiplication and finding the roots of a cubic equation. Table 3 lists the performance improvement in these fundamental algorithms. A significant speed-up occurred in the linear solver, where performance was increased by nearly a factor of six.

TABLE 3

Execution Times for Fundamental Algorithms

| Algorithm | Before | After | Speed-up |
|---|---|---|---|
| EOS Parameters | 0.69 µs | 0.36 µs | 1.92x |
| Fugacity Derivatives | 1.27 µs | 0.59 µs | 2.15x |
| Jacobian (S) | 1.48 µs | 0.37 µs | 3.97x |
| Jacobian (PS) | 3.91 µs | 1.54 µs | 2.54x |
| Linear Solver | 9.40 µs | 1.65 µs | 5.70x |

S = Stability, PS = Phase-Split

III. The third example is applicable to hardware supporting SIMD vectors of arbitrary length. The implementation uses SIMD vectors to run several algorithms in parallel by reordering the loops such that the innermost loops depend on the number of simultaneous calculations. Both single and double precision SIMD vectors may be used in vectorization as described herein. Data organization or storage may include interleaving tiles as opposed to storing tiles sequentially in memory. Interleaving tiles can improve SIMD vectorization. The number of interleaved tiles may match the length of the SIMD vector, which may also depend on the hardware architecture. Strips can be interleaved in a similar fashion. Table 4 shows the execution times obtained for the stability and phase-split algorithms for the second and third approaches as compared to a reference execution time.

TABLE 4

Execution Times for Stability and Phase-Split Algorithms

| Algorithm | Reference | Second Approach | Third Approach |
|---|---|---|---|
| Stability | 107 µs | 42.2 µs | 14.0 µs |
| Phase-Split | 59.9 µs | 33.5 µs | 9.7 µs |
| Total | 167 µs | 75.7 µs | 23.7 µs |

Table 5 shows the performance improvement seen for the both the successive substitution and Newton algorithms as applied to the stability and phase split algorithms for the second and third approaches as compared to a reference execution time.

TABLE 5

Execution Times for Successive Substitution
and Newton Algorithms

| Algorithm | Reference | Second Approach | Third Approach |
|---|---|---|---|
| Successive Substitution (S) | 24.5 µs | 19.9 µs | 4.5 µs |
| Successive Substitution (PS) | 23.0 µs | 19.6 µs | 3.0 µs |
| Newton (S) | 82.0 µs | 22.3 µs | 9.5 µs |
| Newton (PS) | 37.9 µs | 13.9 µs | 6.7 µs |

S = Stability, PS = Phase-Split

Table 6 lists the performance improvement in these fundamental algorithms for the second and third approaches as compared to a reference execution time. Note that Tables 4-6 included updated calculations for the second approach that differ slightly from the results of Tables 1-3, respectively.

TABLE 6

Execution Times for Fundamental Algorithms

| Algorithm | Reference | Second Approach | Third Approach |
|---|---|---|---|
| EOS Parameters | 0.69 µs | 0.36 µs | 0.11 µs/0.24 µs |
| Fugacity Derivatives | 1.26 µs | 0.59 µs | 0.18 µs |
| Jacobian (S) | 1.48 µs | 0.37 µs | 0.16 µs |
| Jacobian (PS) | 3.91 µs | 1.53 µs | 0.43 µs |
| Linear Solver | 9.17 µs | 1.48 µs | 0.47 µs |

S = Stability, PS = Phase-Split

In the third example, tile size may no longer be affected by vector length and may be chosen to utilize the registers as efficiently as possible. On GPUs where a small amount of cache memory is available, tile size can be chosen to reduce data transfer between main and cache memory. Likewise, strip length is no longer affected by vector length and can be chosen to match tile size.

Further, tile operations may be redesigned to work in terms of SIMD instructions. Due to a different data structure, the design in the third example may be different than in the second example. A matrix transpose operation may no longer be necessary. Similarly, apart from using the SIMD based tile-operations, the linear solver in the third example may be identical to the linear solver in the first example. Strip operations may be expressed in terms of SIMD instructions and specialization may be used. The complex loops in the linear solver may be unrolled manually or through the use of templates.

INDUSTRY EXAMPLES

The matrix and vector optimizations in instruction limited algorithms described herein may be applied in various scenarios, such as 3D graphics analysis, encryption, data mining, compression, signal processing, image processing, chain rule evaluation, numerical methods such as finite element and finite volume analysis, and pattern recognition such as seismic patterns. In the case of 3D graphics analysis, the matrices can be so small that tiling may not be necessary, but other optimizations described herein may be used. In other cases such as image processing, the matrices can be so large that the operations are memory constrained and maximum speed is obtained when the matrices are tiled for efficient data transfer between memory and cache. For such large matrices, a nested tiling strategy may be used to optimize data transfer between the different cache levels and between cache and registers. Finding optimal tile sizes may rely on trial and error. Moreover, using heterogeneous tiles provides freedom in the choice of tile size.

Additionally, using the present techniques with finite element methods can ensure maximum efficiency when operating on each block without putting any restrictions on the block-size. The variation within each finite element numerical cell may be described by shape functions. This may imply that the coefficient matrix of the linear system resulting from the shape functions is block-sparse, where the non-zero elements appear in clusters. Sparse matrix storage formats may take advantage of this structure by storing each block contiguously in memory. Block sparse matrices can also appear in other numerical methods, such as the finite volume method.

The present techniques may be applied to seismic pattern recognition, where a set of matrix operations are performed on each data point and the neighbors of each data point. The included neighbors define a 3D window centered on the data point of interest. The size and shape of the 3D window is determined by the geological feature one is looking for. Through tiling, the matrix operations may be more efficient.

The present techniques may also be applied to chain rules, where chain rules are used to calculate the derivatives of one set of variables with respect to another when there is an implicit relationship between the two variable sets. Tile and strip optimizations may be applied where small matrix vector operations are associated with chain rules.

Likewise, tile and strip optimizations may be applied to EOS calculations in an EOS model on arbitrary hardware architectures. EOS calculations may be used to determine the stable thermodynamic state of a mixture, and typically include a number of nested loops. The loop and jump overhead associated with loops in EOS calculations may be as computationally expensive as the operations inside the loop. Efforts to analyze EOS models have generally focused on reducing the computational effort associated with the EOS calculations without attention to how the individual EOS calculations may be implemented to take full advantage of the underlying hardware.

Finding the stable thermodynamic state of a mixture corresponds to finding the global minimum of a thermodynamic function, such as Gibbs free energy. Although global minimization techniques exist, they are generally too computationally expensive to include in reservoir simulations. As a result, the petroleum industry has largely converged on an equation-solving approach where EOS calculations are divided into stability tests and phase split calculations.

A stability test may determine whether a given phase is stable or splits into at least two distinct phases. If the test phase is unstable, the amount and composition of all phases may be determined by a phase split calculation. Subsequently, the stability test may be repeated for at least one of the new phases to determine if more phases exist. The stability test may be repeated until a stable configuration of phases has been determined. Generally, water is considered immiscible with all other phases, and only non-aqueous phases are included in the EOS calculations.

Figure 6:
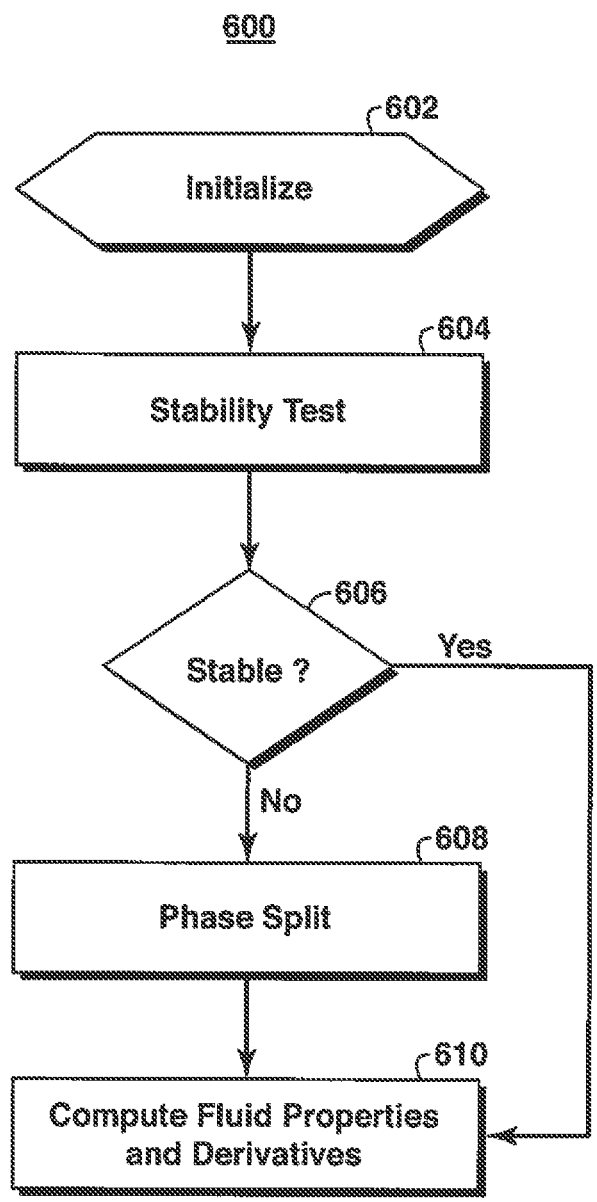
FIG. 6 is a process flow diagram summarizing a method of performing an EOS calculation according to an embodiment of the present techniques.

FIG. 6 is a process flow diagram summarizing a method of performing an EOS calculation according to an embodiment of the present techniques. At block 602, the starting point is initialized with a guess for the equilibrium ratio $K_i$ defined as the mole fraction $n_i$ of component i between phase B and a reference phase A, such that the conditions in Eqn. 1 are satisfied.

$$K_i = n_i^B / n_i^A \tag{1}$$

At block 604, a stability test checks how the formation of a tiny amount of a second phase affects the Gibbs free energy of the mixture, based on an initial guess for $K_i$. In other words, the stability test may determine if the mixture splits into at least two phases. The small perturbation of the original composition justifies using a first order Taylor expansion to describe the Gibbs free energy of the abundant phase. The resulting set of non-linear equations to solve is shown in Eqn. 2.

$$\ln N_i + \ln \phi_i(T,P,n_j) - \mu_i^0(T,P,n_j^0) = 0 \tag{2}$$

In Eqn. 2, $\mu$ is chemical potential, $\phi$ is fugacity, and the superscript '0' denotes the fluid properties of the original mixture. The variable $N_i$ relates to mole fractions $n_i$ through the expression shown in Eqn. 3.

$$n_i = N_i / \Sigma N_j \tag{3}$$

At block 606, the stability of the mixture is determined. If the stability test concludes that the mixture is stable, the method proceeds to block 610. A stable mixture requires no further phase split because there is only one phase present, and the Gibbs free energy will not decrease with the formation of another phase. However, if the stability test concludes that the Gibbs free energy does decrease with the formation of another phase, the mixture is not stable and the method proceeds to block 608. At block 608, a phase split calculation is performed. The phase split will determine the amount and the composition of each phase present in each simulation cell. The corresponding set of non-linear equations to solve expresses chemical equilibrium between phases, as shown in Eqn. 4.

$$\ln K_i - \ln \phi_i^A(T,P,n_j^A) + \ln \phi_i^B(T,P,n_j^B) = 0 \tag{4}$$

From mass conservation it can be shown that mole fractions n, relate to equilibrium ratios by the expressions in Eqn. 5.

$$n_i^A = n_i^0 / (1 + \beta(K_i - 1)), n_i^B = K_i n_i^A \tag{5}$$

In Eqn. 5, $\beta$ is the solution to the Rachford-Rice equation given by Eqn. 6.

$$RR = \Sigma n_i^0 (K_i - 1) / (1 + \beta(K_i - 1)) = 0 \tag{6}$$

The approach readily extends to multiple phases.

After completing the phase split calculation, the method proceeds to block 610, where selected fluid properties and derivatives are computed for each phase. This information is needed when modeling the flow of each phase in the simulation.

The non-linear nature of the stability and phase split equations requires an iterative solution procedure. A common approach is to use successive substitutions (SS) until a switching criterion is met and then use Newton iterations until convergence.

Figure 7:
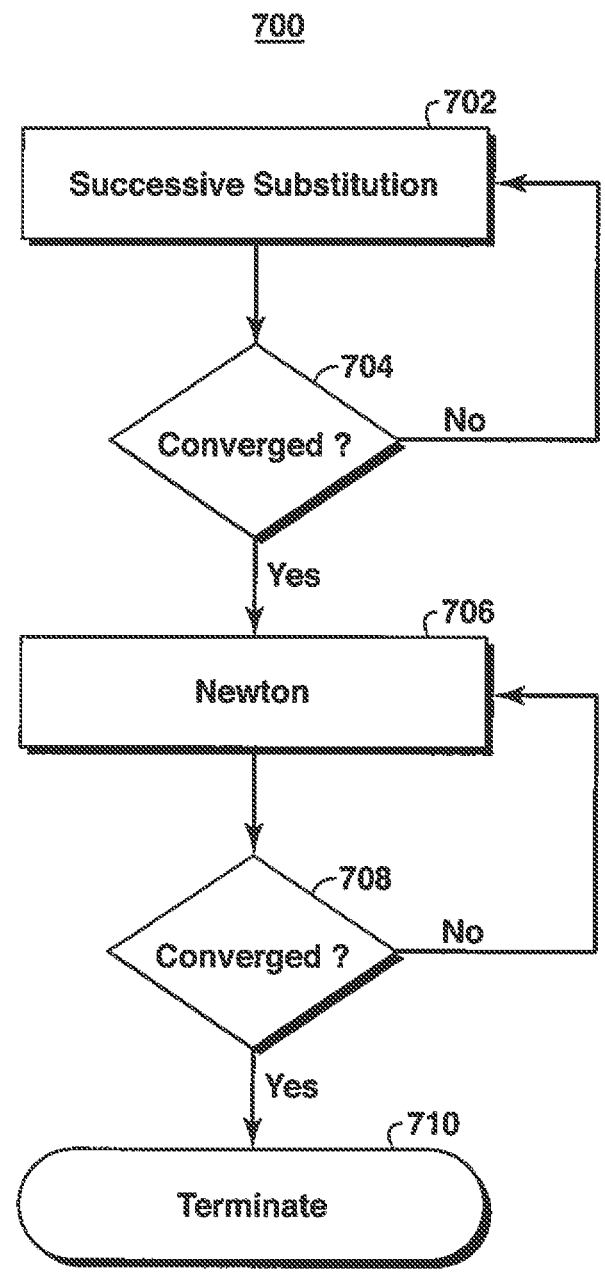
FIG. 7 is a process flow diagram summarizing the iterative nature of stability and phase-split algorithms for an EOS calculation according to an embodiment of the present techniques.

FIG. 7 is a process flow diagram 700 summarizing the iterative nature of stability and phase-split algorithms for an EOS calculation according to an embodiment of the present techniques. At block 702, successive substitution is performed. The steps of successive substitution are further described in FIG. 8. At block 704, a check on the convergence of the successive substitution is performed. If the successive substitution has converged, the method proceeds to block 706. If the successive substitution has not converged, the method returns to block 702. In this manner, successive substitution is performed, in a loop, until a switching criterion is met, as described below.

Likewise, at block 706, the Newton calculation is performed. The steps of a Newton calculation are further described in FIG. 8. At block 708, a check on the convergence of the Newton calculation is performed. If the Newton calculation has converged, the method terminates at block 710. If the Newton calculation has not converged, the method returns to block 706. In this manner, the Newton calculation is performed in a loop until the calculation has converged.

Typically, checking for convergence may imply comparing a norm of the residuals of Eqn. 2 or Eqn. 4 to a predetermined criterion. With the successive substitution loop, the criterion may be relatively loose, while the criterion for the Newton loop may be much stricter. Because the convergence criterion of the successive substitution loop determines when the algorithm switches to the Newton loop, it is frequently referred to as the switching criterion.

Figure 8:
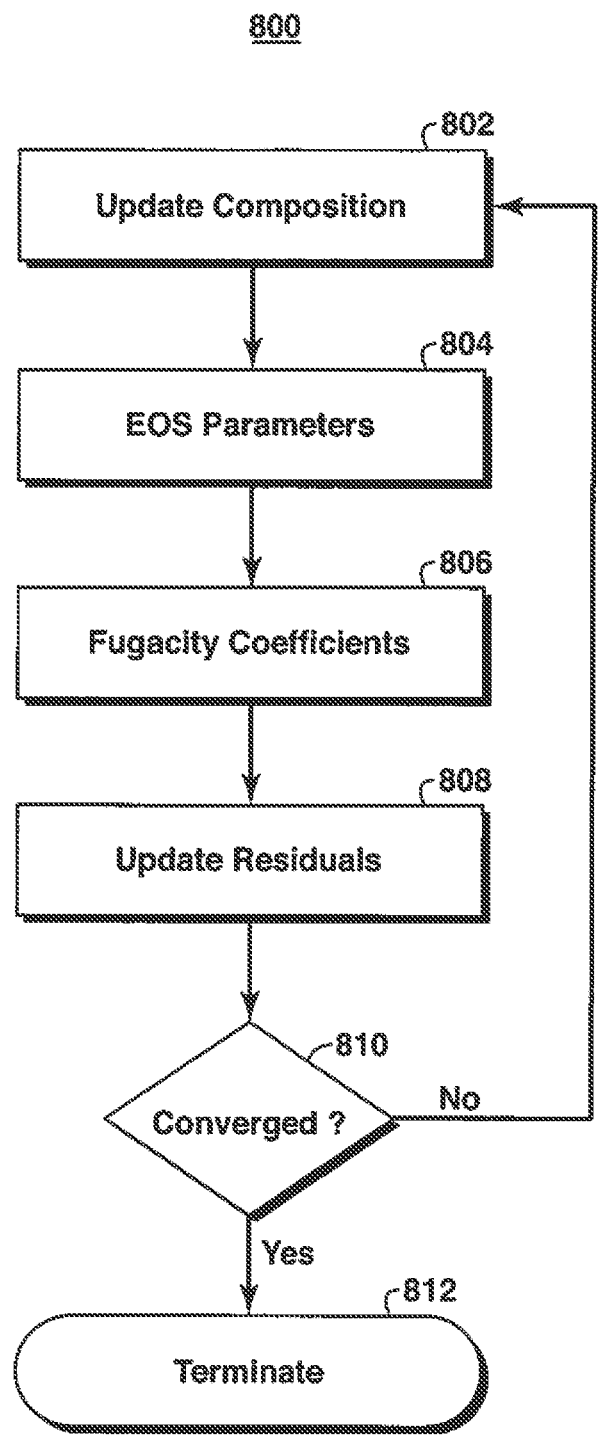
FIG. 8 is a process flow diagram summarizing a method of performing the successive substitution and Newton algorithms according to an embodiment of the present techniques.

FIG. 8 is a process flow diagram 800 summarizing a method of performing the successive substitution (block 702 of FIG. 7) and Newton algorithms (block 706 of FIG. 7) according to an embodiment of the present techniques. Both the successive substitution algorithm (block 702 of FIG. 7) and Newton algorithm (block 706 of FIG. 7) involve the same basic calculations. At block 802, the composition is updated. The main difference in the successive substitution algorithm (block 702 of FIG. 7) and Newton algorithm (block 706 of FIG. 7) is how the composition is updated.

When performing successive substitution, the composition is updated by updating $\ln N_i$ and $\ln K_i$ directly from Eqn. 2 and Eqn. 4. Subsequently, the corresponding mole fractions are computed from equations Eqn. 3 and Eqn. 5, respectively. The Newton algorithms update composition based on the residuals of equations Eqn. 2 and Eqn. 4. The residuals of Eqn. 2 and Eqn. 4 may be described as the amount by which the left hand side of each respective equation deviates from zero. Exactly how the residuals translate into composition updates is determined by the Jacobian of the linear systems. The Jacobian of the linear systems refers to the matrix the derivatives of equations Eqn. 2 and Eqn. 4, respectively. Additionally, the Newton algorithms involve calculating fugacity derivatives and solving a linear system of equations, as further explained in FIG. 9.

While the Newton algorithm converges rapidly whenever a good initial guess is provided, it may diverge when the initial guess is far from the true solution. Accordingly, the more robust successive substitutions may be used to obtain a good initial guess. The Newton algorithm may then be applied until convergence. Although the Newton algorithms are computationally more costly than successive substitutions, the cost may be justified by an increased convergence rate.

At block 804, the EOS parameters are updated, and at block 806 fugacity coefficients are updated. At block 808, residuals are updated. At block 810, a check for convergence is performed. If the algorithm has converged, the method terminates at block 812. If the algorithm has not converged, the method returns to block 802.

Figure 9:
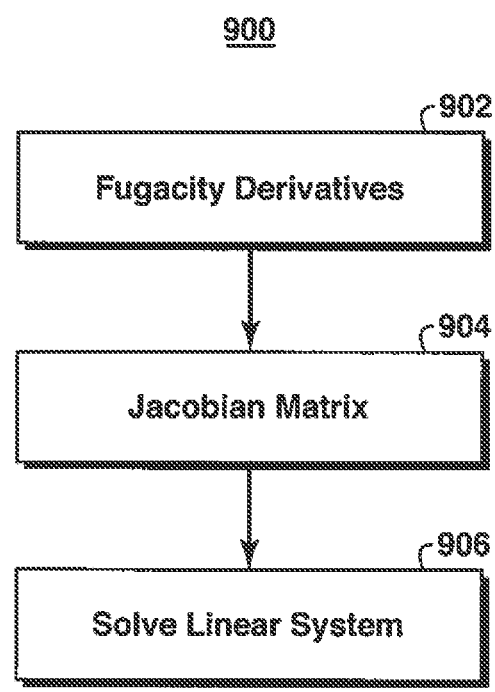
FIG. 9 is a process flow diagram summarizing a method of how compositions may be updated within a Newton iteration according to an embodiment of the present techniques.

FIG. 9 is a process flow diagram summarizing a method of how compositions may be updated within a Newton iteration. At block 902, fugacity derivatives with respect to mole fractions are computed.

At block 904, the fugacity derivatives are used to construct the Jacobian matrix of the nonlinear system of equations to be solved. The Jacobian matrix is defined as the residual derivatives with respect to primary variables. In the stability and phase split algorithms, residuals are defined by Eqn. 2 and Eqn. 4, respectively.

At block 906, the resulting linear system of equations is solved to update the primary variables. Once the primary variables are determined, composition is readily updated. Through specialization, EOS algorithms may be generated for selected numbers of components, allowing the compiler to unroll more loops. Also, an alternative use of SIMD/SIMT vectorization is to run EOS calculations for multiple mixtures in parallel by reordering the loops, such that the innermost loops depend on the number of simultaneous EOS calculations. Using tiles reduces loop and jump overhead in EOS calculations because the number of iterations of loops associated with the matrix operations depends on the number of tiles instead of the number of components in the mixture. EOS the operations may also be used to calculate fugacity derivatives and for construction of the Jacobian matrix in the Newton algorithms. The Newton algorithm also uses linear solvers. In EOS calculations, the Jacobian matrices are dense, such that most elements are nonzero. Two common algorithms solving linear sets of equations with dense Jacobian matrices are Gaussian elimination and LU factorization, which can both be expressed in terms of tile operations.

System

Figure 10:
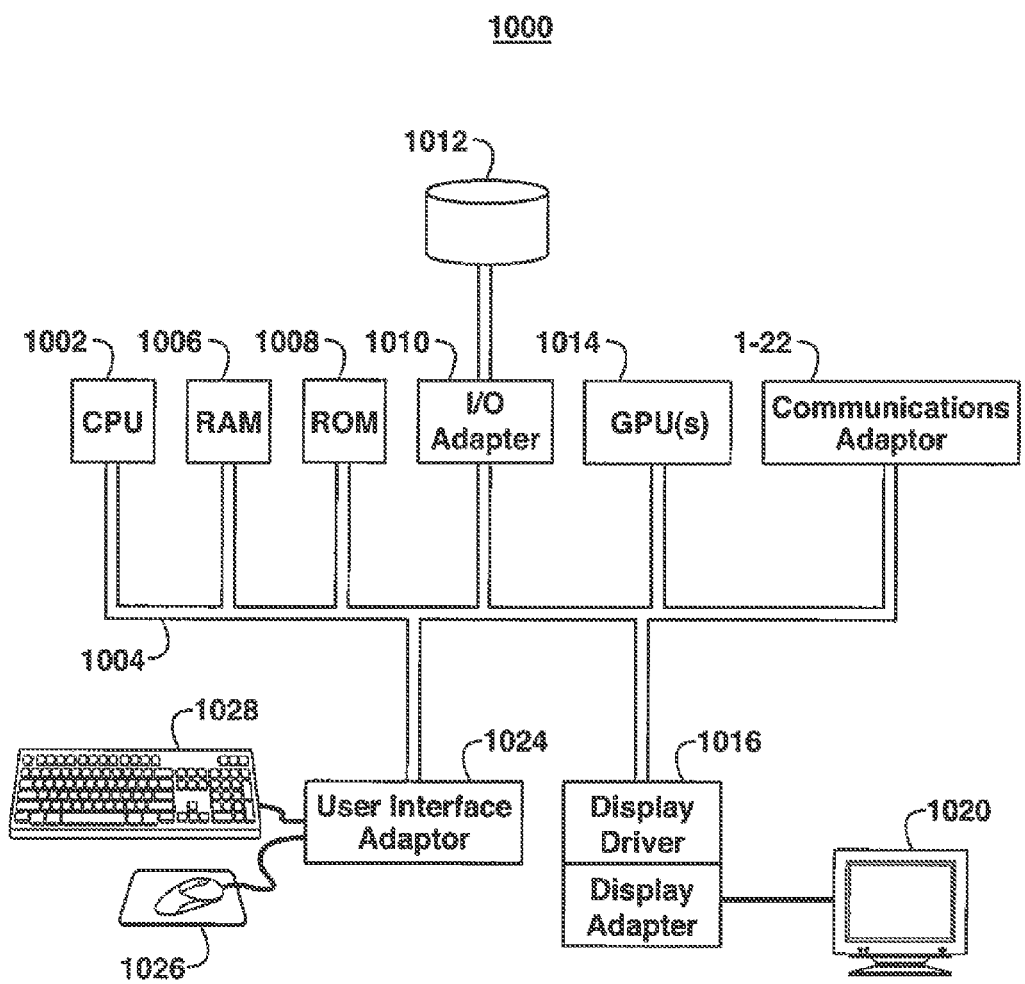
FIG. 10 is a block diagram of a computer system that may be used to optimize matrix and vector calculations in instruction limited algorithms according to an embodiment of the present techniques.

FIG. 10 is a block diagram of a computer system 1000 that may be used to optimize matrix and vector calculations in instruction limited algorithms according to an embodiment of the present techniques. A central processing unit (CPU) 1002 is coupled to system bus 1004. The CPU 1002 may be any general-purpose CPU, although other types of architectures of CPU 1002 (or other components of exemplary system 1000) may be used as long as CPU 1002 (and other components of system 1000) supports the operations as described herein. Those of ordinary skill in the art will appreciate that, while only a single CPU 1002 is shown in FIG. 10, additional CPUs may be present. Moreover, the computer system 1000 may include a graphics processing unit (GPU) 1014. The system may comprise a networked, multi-processor computer system that may include a hybrid parallel CPU/GPU system. The CPU 1002 and GPU 1014 may execute logical instructions according to various exemplary embodiments. For example, the CPU 1002 may execute instructions in parallel with GPU 1014 for performing processing according to the operational flow described above in conjunction with FIGS. 1, and 6-9. The processing described may be performed in parallel.

The computer system 1000 may also include computer components such as non-transitory, computer-readable media. Examples of computer-readable media include a random access memory (RAM) 1006, which may be SRAM, DRAM, SDRAM, or the like. The computer system 1000 may also include additional non-transitory, computer-readable media such as a read-only memory (ROM) 1008, which may be PROM, EPROM, EEPROM, or the like. RAM 1006 and ROM 1008 hold user and system data and programs, as is known in the art. The computer system 1000 may also include an input/output (I/O) adapter 1010, a communications adapter 1022, a user interface adapter 1024, a display driver 1016, and a display adapter 1018. The I/O adapter 1010, the user interface adapter 1024, and/or communications adapter 1022 may, in certain embodiments, enable a user to interact with computer system 1000 in order to input information.

The I/O adapter 1010 may connect additional non-transitory, computer-readable media such as a storage device(s) 1012, including, for example, a hard drive, a compact disc (CD) drive, a floppy disk drive, a tape drive, and the like to computer system 1000. The storage device(s) may be used when RAM 1006 is insufficient for the memory requirements associated with storing data for operations of embodiments of the present techniques. The data storage of the computer system 1000 may be used for storing information and/or other data used or generated as disclosed herein. User interface adapter 1024 couples user input devices, such as a keyboard 1028, a pointing device 1026 and/or output devices to the computer system 1000. The display adapter 1018 is driven by the CPU 1002 to control the display on a display device 1020 to, for example, display information or a representation pertaining to the simulation resulting from calculations according to certain exemplary embodiments.

The architecture of system 1000 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

In an embodiment, input data to the computer system 1000 may include 3D graphics data, image data, reservoir models, and EOS models. Input data may additionally include various matrix and vector data.

The present techniques may be susceptible to various modifications and alternative forms, and the exemplary embodiments discussed above have been shown only by way of example. However, the present techniques are not intended to be limited to the particular embodiments disclosed herein. Indeed, the present techniques include all alternatives, modifications, and equivalents falling within the spirit and scope of the appended claims.

What is claimed is:

1. A method of optimizing matrix and vector operations in instruction limited algorithms that perform EOS calculations, comprising:
   dividing each matrix associated with an EOS stability equation or an EOS phase split equation into a number of tiles, wherein the tile size is heterogeneous or homogenous;
   dividing each vector associated with the EOS stability equation or the EOS phase split equation into a number of strips;
   storing the tiles and strips in main memory, cache, or registers, wherein the tiles or strips are stored sequentially or interleaved in main memory, cache, or registers; and
   performing the matrix and vector operations associated with successive substitutions and Newton iterations in parallel using the tiles and strips.

2. The method recited in claim 1, wherein the tile size is selected in order to minimize data transfers between different levels of a memory within a single hardware architecture.

3. The method recited in claim 1, comprising unrolling loops based on tile or strip sizes associated with the EOS calculations.

4. The method recited in claim 1, comprising dividing each matrix into a number of tiles, wherein the matrix is padded to a size that allows for the use of homogeneous tiles.

5. The method recited in claim 1, comprising unrolling loops through specialization, wherein a number of different EOS algorithms are generated for mixtures with different numbers of components.

6. The method recited in claim 1, comprising single precision, double precision, or mixed precision vectorization of EOS calculations or data elements within the tiles and strips associated with EOS calculations using single instruction multiple data or single instruction multiple thread vector instructions.

7. A computer system that is adapted to optimize matrix and vector operations in instruction limited algorithms that perform EOS calculations, the computer system comprising:
   a processor; and
   a tangible, machine-readable storage medium that stores machine-readable instructions for execution by the processor, the machine-readable instructions comprising:
   code that, when executed by the processor, is adapted to cause the processor to divide each matrix associated with an EOS stability equation and an EOS phase split equation into a number of tiles, wherein the tile size is heterogeneous or homogenous;
   code that, when executed by the processor, is adapted to cause the processor to divide each vector associated with the EOS stability equation and the EOS phase split equation into a number of strips;
   code that, when executed by the processor, is adapted to cause the processor to store the tiles and strips in main memory, cache, or registers, wherein the tiles or strips are stored sequentially or interleaved in the main memory, cache, or registers; and
   code that, when executed by the processor, is adapted to cause the processor to perform the matrix and vector operations associated with successive substitutions and Newton iterations in parallel using the tiles and strips.

8. The system recited in claim 7, wherein the processor forms a scalar hardware architecture or a vector hardware architecture.

9. The system recited in claim 7, comprising code that, when executed by the processor, is adapted to cause the processor to unroll loops based on tile or strip sizes associated with the EOS calculations.

10. The system recited in claim 7, comprising code that, when executed by the processor, is adapted to cause the processor to divide each matrix into a number of tiles, wherein the matrix is padded to a size that allows for the use of homogeneous tiles.

11. The system recited in claim 7, comprising code that, when executed by the processor, is adapted to cause the processor to generate a number of different EOS algorithms for mixtures with different numbers of components.

12. The system recited in claim 7, comprising code that, when executed by the processor, is adapted to cause the processor to perform vectorization of single precision, double precision, or mixed precision EOS calculations or data elements within the tiles and strips associated with EOS calculations using single instruction multiple data or single instruction multiple thread vector instructions.

13. A non-transitory, computer readable medium comprising code configured to direct a processor to:
   divide each matrix associated with an EOS stability equation and an EOS phase split equation into a number of tiles, wherein the tile size is heterogeneous or homogenous;
   divide each vector associated with the EOS stability equation and the EOS phase split equation into a number of strips;
   store the tiles and strips in main memory, cache, or registers, wherein the tiles or strips are stored sequentially or interleaved in main memory, cache, or registers; and perform the matrix and vector operations associated with successive substitutions and Newton iterations in parallel using the tiles and strips.

14. The non-transitory, computer readable medium recited in claim 13, comprising unrolling loops based on tile or strip sizes associated with the EOS calculations.

15. The non-transitory, computer readable medium recited in claim 13, comprising dividing each matrix into a number of tiles, wherein the matrix is padded to a size that allows for the use of homogeneous tiles.

16. The non-transitory, computer readable medium recited in claim 13, comprising unrolling loops through specialization, wherein a number of different EOS algorithms are generated for mixtures with different numbers of components.

17. The non-transitory, computer readable medium recited in claim 13, comprising single precision, double precision, or mixed precision vectorization of EOS calculations or data elements within the tiles and strips associated with EOS calculations using single instruction multiple data or single instruction multiple thread vector instructions.

* * * * *